United States Patent [19]
Schroer

[11] 3,758,917
[45] Sept. 18, 1973

[54] CASTER AND MOUNTING STRUCTURE

[75] Inventor: Gary J. Schroer, Kansas City, Mo.

[73] Assignee: Schroer Manufacturing Company, Inc., Kansas City, Mo.

[22] Filed: Jan. 10, 1972

[21] Appl. No.: 216,384

[52] U.S. Cl. .......................................... 16/36, 16/29
[51] Int. Cl. ............................................. B60b 33/00
[58] Field of Search ...................... 16/29, 30, 31, 36

[56] References Cited
UNITED STATES PATENTS

| | | | |
|---|---|---|---|
| 2,998,617 | 9/1961 | Murphy | 16/36 |
| 1,709,845 | 4/1929 | Eberly | 16/36 |
| 3,478,381 | 11/1969 | Schultz, Jr. | 16/29 |
| 2,914,364 | 11/1959 | Ross | 16/36 |

Primary Examiner—James T. McCall
Assistant Examiner—Doris L. Troutman
Attorney—Claude A. Fishburn et al.

[57] ABSTRACT

A caster and mounting structure particularly adapted for use with supported structures which are frequently cleaned in a manner removing lubricant from the caster. The structure to be supported has suitably arranged sockets or mounting portions each to receive a pintle supported on a horn for rotation of the caster. The mounting and pintle have interengageable surfaces to prevent relative rotation. A lubrication fitting mounted on a side of the pintle and communicates with a lubricant passage through the pintle and discharges within a lubricant chamber to provide lubrication for bearings rotatably supporting the horn on the pintle.

3 Claims, 4 Drawing Figures

PATENTED SEP 18 1973

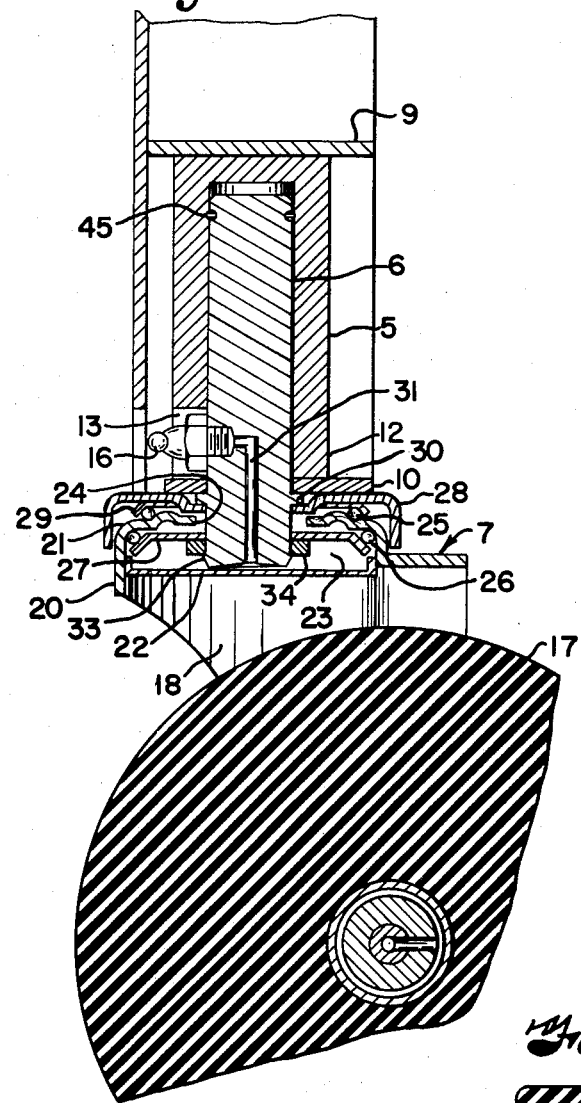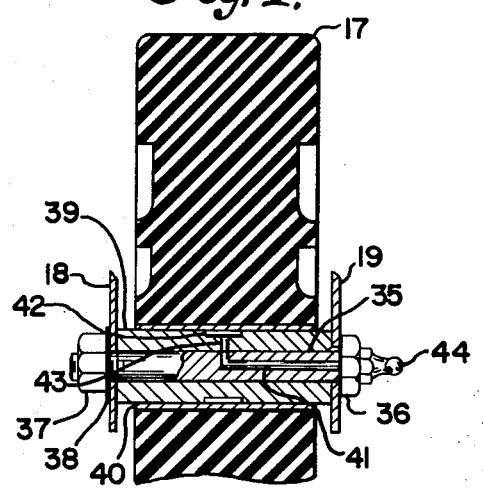

CASTER AND MOUNTING STRUCTURE

The present invention relates to casters and means for lubricating same and more particularly to a caster and mounting structure particularly adapted for use with animal cages which are frequently cleaned in a manner to remove lubricant from the caster.

Animal cages having casters thereon are frequently cleaned to maintain same in a sanitary condition, particularly when used to house test animals, such as primates, dogs, and the like, and such cleaning may be accomplished by means of high pressure steam which removes lubricants from the casters.

The principal objects of the present invention are: to provide a caster and mounting structure particularly adapted for use with supported structures which are frequently cleaned in a manner removing lubricant from the casters; to provide such a caster and mounting structure which is easily cleaned and adapted to receive and retain replacement lubricant; to provide such a caster and mounting structure having a lubricant chamber for retaining lubricant therein; to provide such a caster constructed to permit relative rotation between a pintle and horn while limiting relative rotation between the pintle and a structure to be supported on the caster; to provide such a caster and mounting structure providing easy access to a fitting for providing a lubricant to a lubricant chamber within the horn and surrounding a portion of the pintle; to provide such a caster and mounting structure having a socket portion receiving the pintle with the pintle having a passageway through a portion thereof and discharging into a lubricant chamber within the horn; and to provide such a caster and mounting structure which is economical to manufacture, durable in construction, and particularly well adapted for the proposed use.

Other objects and advantages of the present invention will become apparent from the following description taken in connection with the accompanying drawings wherein are set forth by way of illustration and example certain embodiments of this invention.

The drawings constitute a part of this specification and include an exemplary embodiment illustrating various objects and features of the caster and mounting structure of the present invention.

FIG. 3 is an enlarged vertical sectional view taken on line 3—3, FIG. 2.

FIG. 4 is an enlarged sectional view of a caster wheel showing means for lubricating an axle having the wheel rotatably mounted thereon.

Figure 1:
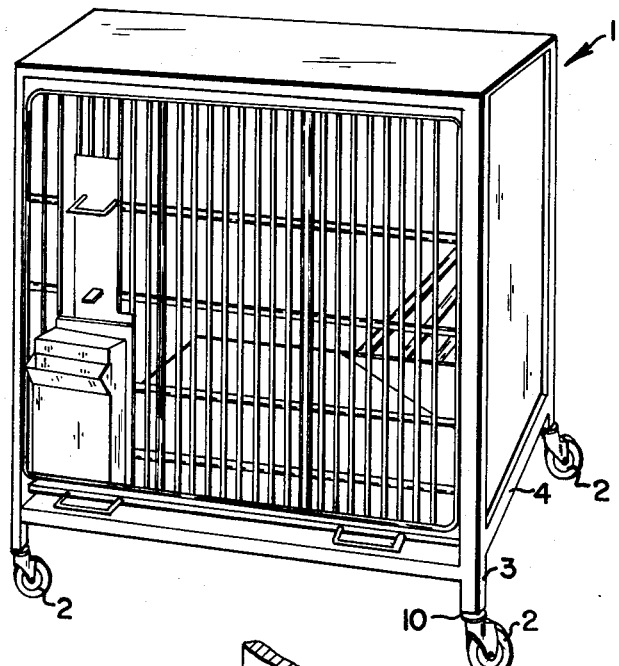
FIG. 1 is a perspective view of an animal cage supported on casters and mounting structures embodying features of the present invention.
Figure 2:
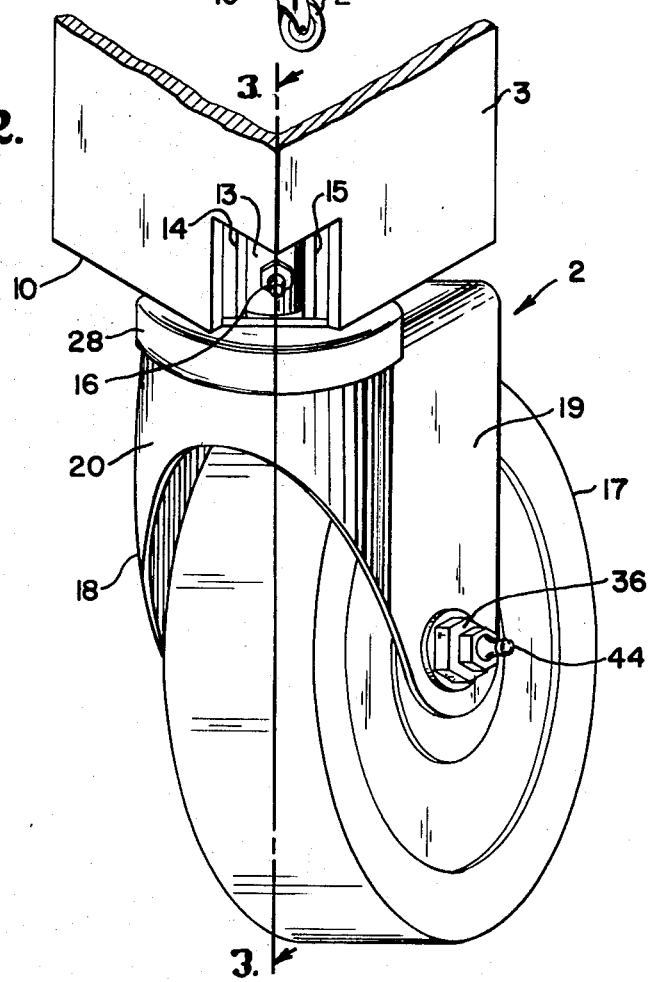
FIG. 2 is an enlarged perspective view of the caster and mounting structure.

Referring more in detail to the drawings:

As required detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriate detailed structure.

In the disclosed embodiment of the present invention, the reference numeral 1 generally designates a structure such as an animal cage which is frequently cleaned in a manner removing lubricant from supporting casters 2 mounted in portions or legs 3 of a frame or member of the structure 1.

In the structure illustrated, the frame has a plurality of legs 3 and each leg 3 has a socket portion 5, as later described, to receive a respective pintle 6 supported on a horn 7 for relative rotation therebetween.

The legs 3 of the frame structure 4 may be any suitable structural shape, such as channel, angle, square or round pipe, and the like. The legs 3 are illustrated as angles having portions in substantially normal relation and a plate 9 suitably secured to the portions, as be welding, and positioned adjacent a lower end 10 of the leg. 3. A depending socket portion 5 has an upper end suitably secured to a lower surface of the plate 9, as by welding, and a lower end 12 thereof positioned adjacent the lower end 10 of the respective leg 3. The socket portion 5 has a side wall defining an elongated generally cylindrical recess extending upwardly from the lower end 12 thereof to receive the pintle 6 therein, as later described. The socket portion 5 has a notch 13 in the lower end of a side wall defining the upwardly extending recess, said wall having spaced upright surfaces defining abutment surfaces 14 and 15 to be engaged by a member 16 secured to the pintle 6 and preventing rotation thereof, as later described.

The horn 7 has a wheel 17 rotatably mounted adjacent a lower end thereof, as later described. The horn 7 has spaced side legs 18 and 19 joined by a side wall 20 defining a generally cylindrical upper end portion thereof and a top wall 21 connected to the side wall 20 to define an upper end of the horn 7. A bottom closure member 22 is spaced below the top wall 21 and suitably secured to the side wall 20, as by welding, to enclose a lubricant chamber 23 between the side wall 20, top wall 21, and bottom closure member 22.

The top wall 21 has a central aperture 24 therein to permit the pintle 6 to extend through the top wall 21 and into the lubricant chamber 23.

Upper and lower surfaces of the top wall 21 are formed to define races for upper and lower bearings 25 and 26 respectively. A lower race 27 is positioned within the lubricant chamber 23 and suitably supported in fixed relation on the pintle 6 to maintain the lower bearings 26 in position between the lower race 27 and a lower surface of the top wall 21. An upper cap 28 has an upper race 29 preferably secured relative a lower surface thereof and engageable with the upper bearings 25. The upper cap 28 is maintained in position by the pintle 6 to thereby maintain the upper bearings 25 in position between the top wall 21 and the upper race 29.

The pintle 6 is illustrated as an elongated, cylindrical member having a flange 30 extending radially outwardly therefrom. The flange 30 is positioned adjacent a lower end of the pintle 6 and is engaged with the lower end 12 of the socket portion 5 or the lower end 10 of the respective leg 3, as desired. A lubricant passage 31 extends between the member 16 which is a suitable pressure lubrication fitting and a lower end 33 of the pintle 6 with the lower end 33 being positioned within the lubricant chamber 23 whereby lubricant may be communicated to the lubricant chamber 23 from the fitting 16.

The pintle 6 is supported on the horn 7 to permit relative rotational movement therebetween and the lower end 33 of the pintle 6 is maintained in the lubricant chamber 23, as by splitting and upsetting after being positioned in engagement with the upper cap 28 and the lower race 27. In the illustrated structure, a suitable spacer, such as a washer 34 is supported on the upset lower end 33 and in engagement with the lower race 27 thereby maintaining the upper cap 28 in engagement with a lower surface of the flange 30.

The wheel 17 is rotatably mounted on a lower end of the horn 7 and in the illustrated structure, the side legs 18 and 19 have aligned apertures therein to receive a suitable axle 35 in the form of a bolt having a head 36 engaging one of the side legs and a nut 37 threadedly mounted on the other end of the side legs and a nut 37 threadedly mounted on the other end of the axle 35 and engaging a suitable washer 38 in engagement with the other side leg. A bushing 39 is sleeved on the axle 35 and is received within a hub portion 40 of the wheel 17.

It is desirable to provide a suitable lubricant to the axle 35, bushing 39 and hub portion 40, therefore, the axle 35 has a lubricant passage 41 extending a portion thereof and having one end positioned coaxially with the head 36 and an other end discharging through a side of the axle 35. The bushing has a circumferentially extending annular recess 42 in an exterior surface thereof and positioned intermediate the ends thereof. At least one lubricant passage 43 extends between an inner surface of the bushing 39 and the annular recess 42 to permit flow of lubricant from between the axle 35 and the annular recess 42. A fitting 44 is mounted on the head 36 of the axle 35 and communicates with the lubricant passage 41 to permit introduction of lubricant under pressure to the axle 35, bushing 39 and hub portion 30 for substantially friction free rotation of the wheel 17 on the axle 35.

The caster structure is assembled with the parts arranged as described. A suitable snap ring 45 is mounted on the upper end of the pintle 6. The pintle 6 is received within the socket portion 5 with the snap ring 45 being received within a suitable recess in an interior surface of the side wall defining the socket portion 5. The flange 30 engages the lower end 10 of the respective leg 3, as desired. The cage 1 and the caster 2 may be frequently cleaned with the lubricant being replaced after each cleaning through the fittings 16 and 43.

It is to be understood that while I have illustrated and described one form of my invention, it is not to be limited to these specific forms or arrangement of parts herein described and shown.

I claim:
1. A caster and mounting structure comprising:
 a. a caster horn;
 b. a wheel and means rotatably mounting same on said caster horn;
 c. a pintle;
 d. means on a structure to be supported for receiving said pintle, said pintle having a lower end below said structure;
 e. said horn having a side wall defining a generally cylindrical upper end portion thereof, and a top wall connected to said side wall to define the upper end portion of said horn;
 f. a bottom closure member spaced below said top wall and secured to said side wall to form a chamber between said side wall and top wall and bottom closure member;
 g. said top wall having a central aperture therein with the lower end of the pintle extending therethrough;
 h. upper and lower antifriction bearing means engaging said pintle and said top wall to rotatably support the horn relative to said pintle, said lower bearing means being in said chamber;
 i. means on said pintle above said upper bearing means cooperating with said upper end portion of said horn to substantially enclose said upper bearing means;
 j. means on said pintle including a lubricant fitting and a passage to the lower end of said pintle for introducing lubricant under pressure to said chamber and upper and lower bearing means.

2. A caster and mounting structure as set forth in claim 1 wherein:
 a. said means receiving said pintle has a socket portion with a wall defining same;
 b. the wall defining said socket portion has a laterally opening notch in a lower end thereof and having spaced upright surfaces to define spaced abutments,
 c. the fitting is positioned on said pintle and within the notch and engageable with the spaced abutments whereby relative rotation between said pintle and said socket portion is limited to the spacing between the fitting and the spaced abutment surfaces.

3. A caster and mounting structure as set forth in claim 1 wherein:
 a. said means on a structure to be supported for receiving said pintle includes a leg with the socket therein, said leg has a lower end and a notch therein to provide access to said means for providing a lubricant to the lubricant chamber;
 b. said socket portion has a wall defining same and the wall has a notch in a lower end thereof and having spaced upright walls to define spaced abutment surfaces;
 c. said means for providing a lubricant to the lubricant chamber includes a passage through a portion of said pintle and having one end within said lubricant chamber and a fitting mounted in the other end of the passage and adapted to permit introduction of lubricant under pressure into the passage; and
 d. the fitting is positioned on said pintle and within the notch and engageable with the spaced abutment surfaces whereby relative rotation between said pintle and said socket portion is limited to the spacing between the spaced abutment surfaces.

* * * * *